Patented July 19, 1927.

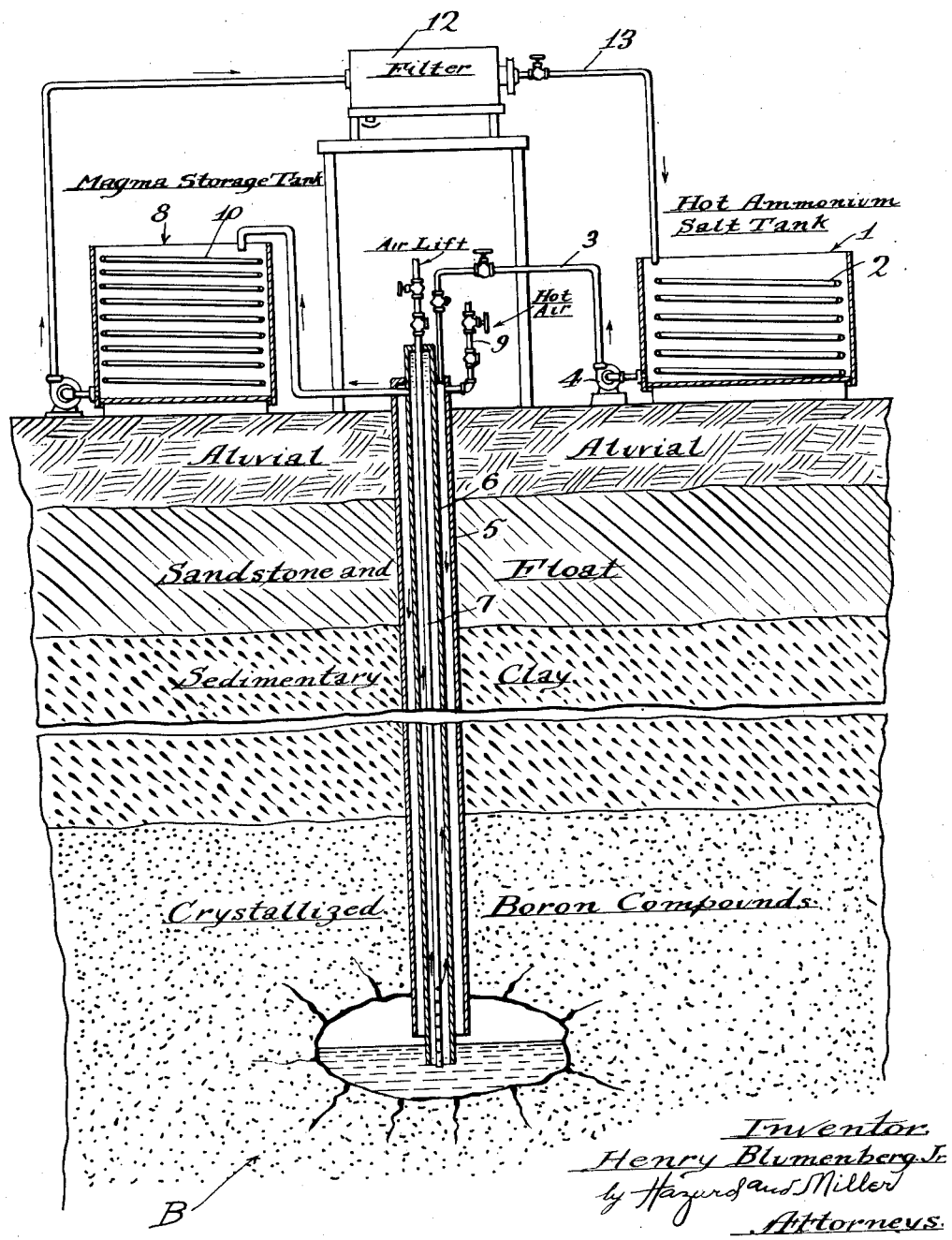

1,636,456

UNITED STATES PATENT OFFICE.

HENRY BLUMENBERG, JR., OF MOAPA, NEVADA.

PROCESS OF MINING INSOLUBLE BORON COMPOUNDS.

Application filed March 23, 1927. Serial No. 177,521.

My invention relates to a process of mining insoluble calcium boron compounds such as colemanite $2CaO.3B_2O_3.5H_2O$ and ulexite $Na_2O.2CaO.5B_2O_3.16H_2O$ when they occur in underground deposits.

In my process I make use of my discovery that ammonium chloride, especially when heated, is capable of dissolving a large percentage of calcium boron compounds which are normally substantially insoluble in water.

The invention contemplates a method of recovering the insoluble calcium boron compounds mentioned by means of a hot ammonium chloride solution which I have discovered will disintegrate the insoluble calcium boron compounds substantially insoluble in water and also dissolve an appreciable percentage thereof. The magma consisting of ammonium chloride, calcium boron compound in solution and the disintegrated undissolved particles thereof are pumped to the surface. The mixture is then cooled. The cooling will cause a part of the dissolved boron compounds to crystallize out and the mixture is then passed through a filter and the ammonium chloride solution containing a percentage of calcium boron compounds in solution is reheated and again caused to be applied to the undissolved boron compounds in the next cycle of operation.

The filter cake, separated from the ammonium chloride solution, contains both the crystallized and the undissolved boron compound, and is then treated in any preferred manner to convert the same into either borax or boric acid, as desired.

My invention consists of the steps of the process hereinafter described and claimed.

In the accompanying drawings, which form a part of the specification, I have shown, in diagram, an apparatus suitable for carrying out my process.

Referring to the drawings, B indicates a deposit of insoluble calcium boron compound such as colemanite or ulexite. 1 indicates a storage reservoir containing an ammonium chloride solution, preferably containing from 5 to 15 per cent of ammonium chloride. Tank 1 is provided with suitable heating coils 2 to heat the ammonium chloride solution up to 200° F. A pipe 3 in which a pump 4 is located conducts the ammonium chloride solution through a well casing 5 extending from the ground to the mineral deposit B. The hot ammonium chloride solution, on contact with the boron compounds B, will dissolve from 1 to 10 per cent thereof by weight compared with the ammonium chloride solution.

Within the casing 5 is a pump casing 6 containing an air lift tube 7 which lifts the magma from the bottom of the well to a magma storage tank 8. In the annular space between the interior pipe 6 and air lift tube 7 I introduce compressed air, preferably hot, by means of a valve controlled air pipe 9 which serves to force the magma at the bottom of the well into the inner pipe 6 to make it accessible to the action of the air lift tube 7. The storage tank 8 may be provided with cooling coils 10. From the storage tank 8 the magma is pumped by means of pump 11 through filter presses 12. The filtrate is conducted from the filter presses 12 by means of pipes 13 to the hot ammonium salt tank 1 to re-enter the cycle of operation.

The operation is as follows:

Ammonium chloride solution containing from 5 to 15 per cent of ammonium chloride is heated up to 200° F. in storage tank 1 and then pumped to the boron deposit where it will disintegrate practically all of the boron compounds, depending on the amount of ammonium chloride in solution, the magma forming a milky liquid which if lifted to the surface of the ground by means of air lift 7 or any other preferred means to the magma storage tank 8 where it is cooled down to 40 to 50° F. which will cause a portion of the dissolved boron compound to crystallize out. The disintegrated boron compound as well as the crystallized boron compounds are then retained in the filter cake by the filter presses 12. The ammonium chloride solution which will contain from 5 to 10 per cent of the boron compound in solution, is conveyed to the hot ammonium chloride storage tank 1 to be again reheated and used for the next cycle of operation.

The filter cake, consisting of the calcium boron compounds, is then treated in any suitable manner for the recovery of borax, boric acid or any other boron compound desired.

In place of the ammonium chloride nitrate or sulphate may be used or any other ammonium salt either singly or in combination.

In the treatment of the insoluble calcium boron compounds with ammonium salts some of the ammonia will be liberated and the same is recovered by any convenient or preferred manner and converted again into ammonium chloride and introduced again into the cycle of operation.

My process is especially intended for the treatment of insoluble calcium boron compounds, but it is also applicable to any other insoluble boron compound.

It will be understood that various changes may be made in the steps of the process by those skilled in the art without departing from the spirit of my invention as claimed.

I claim:

1. A method of mining water insoluble calcium boron compounds comprising introducing a hot ammonium chloride solution to the calcium boron deposit, thereby disintegrating and dissolving a portion thereof, removing and cooling the resulting magma, thereby causing a portion of the dissolved calcium boron compounds to precipitate and removing the soluble part from the insoluble part of the magma, said soluble part containing ammonium chloride and a small percentage of calcium boron compounds in solution.

2. A method of mining water insoluble calcium boron compounds comprising introducing a hot ammonium chloride solution to the calcium boron deposit, thereby disintegrating and dissolving a portion thereof, removing and cooling the resulting magma, thereby causing a portion of the dissolved calcium boron compounds to precipitate and removing the soluble part from the insoluble part of the magma, said soluble part containing ammonium chloride and a small percentage of calcium boron compounds in solution, heating the same and using the same for the next cycle of operation.

3. A method of mining water insoluble boron compounds comprising introducing a hot ammonium salt solution to the boron deposit, thereby disintegrating and dissolving a portion thereof, removing and cooling the resulting magma, thereby causing a portion of the dissolved boron compounds to precipitate and removing the soluble part from the insoluble part of the magma, said soluble part containing ammonium salt and a small percentage of boron compounds in solution.

4. A method of mining water insoluble boron compounds comprising introducing a hot ammonium salt solution to the boron deposit, thereby disintegrating and dissolving a portion thereof, removing and cooling the resulting magma, thereby causing a portion of the dissolved boron compounds to precipitate and removing the soluble part from the insoluble part of the magma, said soluble part containing ammonium salts and a small percentage of boron compounds in solution, heating the same and using the same for the next cycle of operation.

In testimony whereof I have signed my name to this specification.

HENRY BLUMENBERG, JR.